US008863109B2

(12) United States Patent
Skalsky

(10) Patent No.: US 8,863,109 B2
(45) Date of Patent: Oct. 14, 2014

(54) UPDATING SECURE PRE-BOOT FIRMWARE IN A COMPUTING SYSTEM IN REAL-TIME

(75) Inventor: Nathan C. Skalsky, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 370 days.

(21) Appl. No.: 13/192,671

(22) Filed: Jul. 28, 2011

(65) Prior Publication Data
US 2013/0031538 A1    Jan. 31, 2013

(51) Int. Cl.
G06F 9/44 (2006.01)
G06F 21/57 (2013.01)
G06F 9/445 (2006.01)

(52) U.S. Cl.
CPC ............ *G06F 21/572* (2013.01); *G06F 21/575* (2013.01); *G06F 8/665* (2013.01); *G06F 9/4403* (2013.01); *G06F 8/67* (2013.01); *G06F 9/4418* (2013.01)
USPC ....................................................... 717/168

(58) Field of Classification Search
USPC ........................................................ 717/168
See application file for complete search history.

(56) References Cited

U.S. PATENT DOCUMENTS

| | | | |
|---|---|---|---|
| 7,222,339 B2 | 5/2007 | Rothman et al. | |
| 7,305,668 B2 * | 12/2007 | Kennedy et al. | 717/168 |
| 7,421,431 B2 * | 9/2008 | Zimmer et al. | 1/1 |
| 7,421,688 B1 * | 9/2008 | Righi et al. | 717/172 |
| 7,797,473 B2 * | 9/2010 | Rangarajan et al. | 710/260 |
| 7,882,345 B1 * | 2/2011 | Christensen | 713/2 |
| 2004/0158711 A1 * | 8/2004 | Zimmer | 713/165 |
| 2004/0268135 A1 * | 12/2004 | Zimmer et al. | 713/189 |
| 2005/0021968 A1 * | 1/2005 | Zimmer et al. | 713/176 |
| 2005/0125652 A1 * | 6/2005 | Singer et al. | 713/2 |
| 2006/0143600 A1 | 6/2006 | Cottrell et al. | |
| 2009/0307403 A1 * | 12/2009 | Rangarajan et al. | 710/260 |
| 2009/0319806 A1 * | 12/2009 | Smith et al. | 713/193 |
| 2010/0057982 A1 | 3/2010 | Barde | |
| 2010/0082955 A1 * | 4/2010 | Chhabra et al. | 713/1 |
| 2011/0072254 A1 * | 3/2011 | Kuang et al. | 713/2 |
| 2011/0093627 A1 * | 4/2011 | De et al. | 710/33 |
| 2012/0072734 A1 * | 3/2012 | Wishman et al. | 713/189 |
| 2012/0260082 A1 * | 10/2012 | Bobzin | 713/100 |

FOREIGN PATENT DOCUMENTS

WO    WO 2010/014109 A1    2/2010

OTHER PUBLICATIONS

Microsoft Press (Fryer), Computer Dictionary, 1997, Microsoft Press, third ed., p. 262.*
Que's (Ewing), Computer Programmer's Dictionary, 1993, Que, p. 382.*

* cited by examiner

*Primary Examiner* — John Chavis
(74) *Attorney, Agent, or Firm* — Edward J. Lenart; Katherine S. Brown; Biggers Kennedy Lenart Spraggins LLP

(57) ABSTRACT

Updating secure pre-boot firmware in a computing system in real-time, including: storing in a secure firmware memory region a firmware update module configured to update the secure pre-boot firmware; responsive to a user request to update the secure pre-boot firmware: entering a processor management mode, including suspending operating system and user-level data processing operations; executing the firmware update module; and determining whether the secure pre-boot firmware was successfully updated; and exiting the processor management mode, including resuming operating system and user-level data processing operations and notifying the user of the successful update.

18 Claims, 3 Drawing Sheets

UPDATING SECURE PRE-BOOT FIRMWARE IN A COMPUTING SYSTEM IN REAL-TIME

BACKGROUND OF THE INVENTION

1. Field of the Invention

The field of the invention is data processing, or, more specifically, methods, apparatus, and products for updating secure pre-boot firmware in a computing system in real-time.

2. Description of Related Art

Currently secure firmware technologies such as Static Root of Trust Measurement ('SRTM') require the secure code to be updated to check that the update was signed with the same master signing key and to perform (directly or indirectly) the update. As a consequence, when users run online (i.e., operating system resident) or out-of-band ('OOB') firmware update utilities, the users have not actually performed the update until the secure code being updated is executed again. For pre-boot entities such as host BIOS/UEFI firmware, the system must be taken down and completely re-booted to update the host BIOS/UEFI firmware, causing down-time and opening a window for power disruption to corrupt the firmware.

SUMMARY OF THE INVENTION

Methods, apparatus, and products for updating secure pre-boot firmware in a computing system in real-time, including: storing in a secure firmware memory region a firmware update module configured to update the secure pre-boot firmware; responsive to a user request to update the secure pre-boot firmware: entering a processor management mode, including suspending operating system and user-level data processing operations; executing the firmware update module; and determining whether the secure pre-boot firmware was successfully updated; and exiting the processor management mode, including resuming operating system and user-level data processing operations and notifying the user of the successful update.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
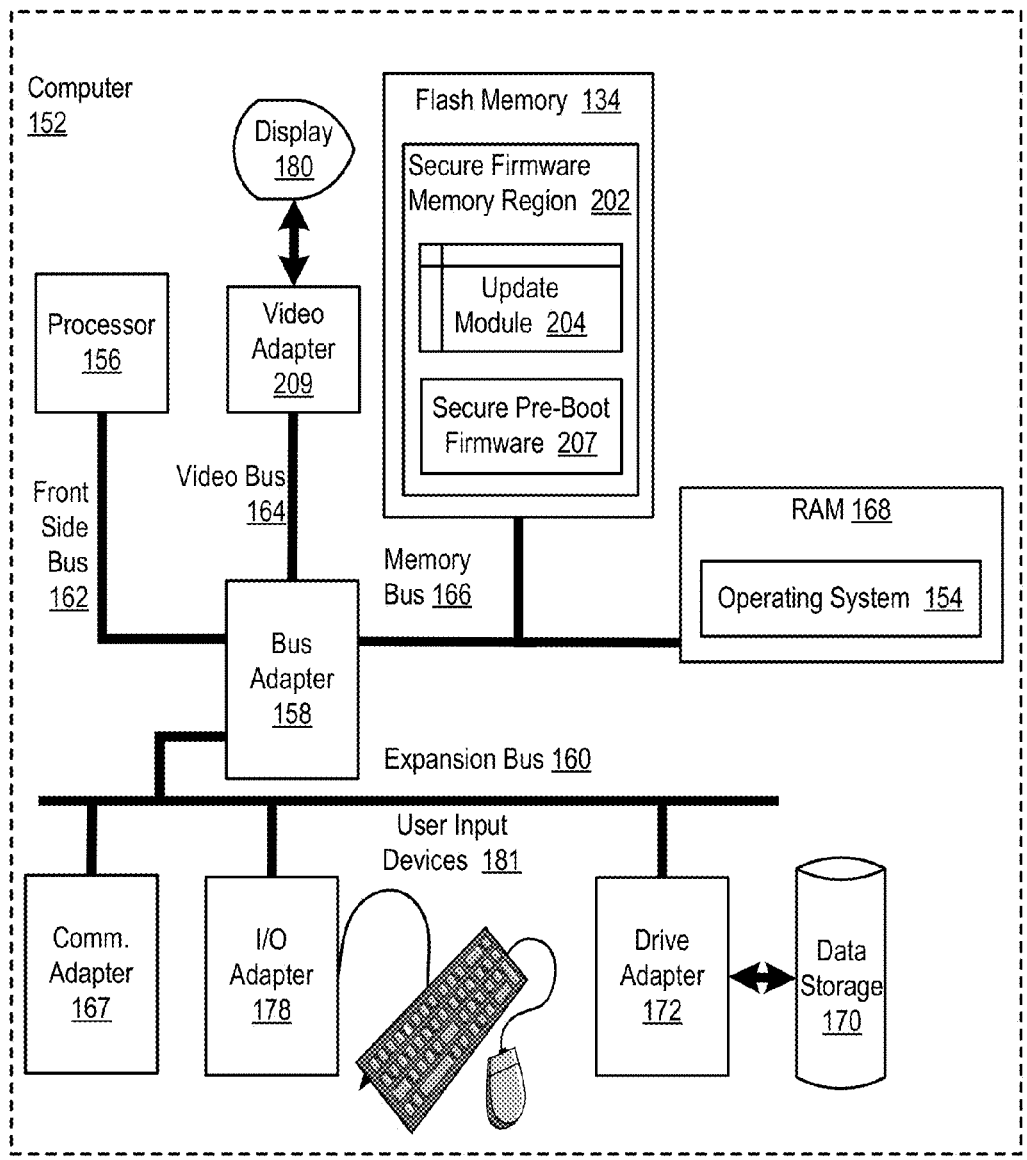
FIG. 1 sets forth a block diagram of automated computing machinery comprising an example computer useful in updating secure pre-boot firmware in a computing system in real-time according to embodiments of the present invention.

Exemplary methods, apparatus, and products for updating secure pre-boot firmware in a computing system in real-time in accordance with the present invention are described with reference to the accompanying drawings, beginning with FIG. 1. FIG. 1 sets forth a block diagram of automated computing machinery comprising an example computer (152) useful in updating secure pre-boot firmware in a computing system in real-time according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is an operating system (154). Operating systems useful secure pre-boot firmware in a computing system in real-time according to embodiments of the present invention include UNIX™, Linux™, Microsoft XP™, AIX™, IBM's i5/OS™, and others as will occur to those of skill in the art.

The computer (152) also includes flash memory (134). In the example of FIG. 1, the flash memory (134) is a non-volatile computer storage chip that can be electrically erased and programmed. In the example of FIG. 1, the flash memory (134) includes a secure firmware memory region (202). The secure firmware memory region (202) of FIG. 1 is portion of computer memory in a computer (152) that is reserved for secure code. Code is characterized as being 'secure code' because the code is executed in a system management mode ('SMM'). SMM is an operating mode in which all normal execution of software in the computer (152) is suspended and secure code such as firmware is executed in a high-privilege mode. While the computer (152) is operating in SMM mode, execution of the operating system (154) and all user-level applications is suspended.

In the example of FIG. 1, the secure firmware memory region (202) includes secure pre-boot firmware (207). The secure pre-boot firmware (207) of FIG. 1 is a module of computer program instructions that are the first computer program instructions executed by the computer (152) when the computer (152) is powered on. The secure pre-boot firmware (207) may be configured to initialize system devices, set the system clock, enable or disable system components, and so on. In the example method of FIG. 2, the operating system (154) only begins executing after the secure pre-boot firmware (207) has executed.

In the example of FIG. 1, the secure firmware memory region (202) includes a firmware update module (204). The firmware update module (204) is a module of computer program instructions that, when executed, perform updates to secure pre-boot firmware (207). The firmware update module (204) may perform updates to secure pre-boot firmware (207), for example, by altering computer program instructions contained in the secure pre-boot firmware (207), adding computer program instructions to the secure pre-boot firmware (207), deleting computer program instructions from the secure pre-boot firmware (207), and so on.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for secure pre-boot firmware in a computing system in real-time according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for secure pre-boot firmware in a computing system in real-time according to embodiments of the present invention include modems for wired dial-up communications, Ethernet (IEEE 802.3) adapters for wired data communications network communications, and 802.11 adapters for wireless data communications network communications.

The computer (152) of FIG. 1 updates secure pre-boot firmware (207) in real-time according to embodiments of the present invention. The computer (152) of FIG. 1 updates secure pre-boot firmware (207) in real-time by storing, in a secure firmware memory region (202), a firmware update module (204) configured to update the secure pre-boot firmware (207). The computer (152) of FIG. 1 also updates secure pre-boot firmware (207) in real-time by, responsive to a user request to update the secure pre-boot firmware (207), entering a processor management mode. In the example of FIG. 1, entering the processor management mode includes suspending operating system (154) and user-level data processing operations. The computer (152) of FIG. 1 also updates secure pre-boot firmware (207) in real-time by executing the firmware update module (204). The computer (152) of FIG. 1 also updates secure pre-boot firmware (207) in real-time by determining whether the secure pre-boot firmware (207) was successfully updated. The computer (152) of FIG. 1 also updates secure pre-boot firmware (207) in real-time by, responsive to determining that the secure pre-boot firmware was successfully updated, exiting the processor management mode.

Figure 2:
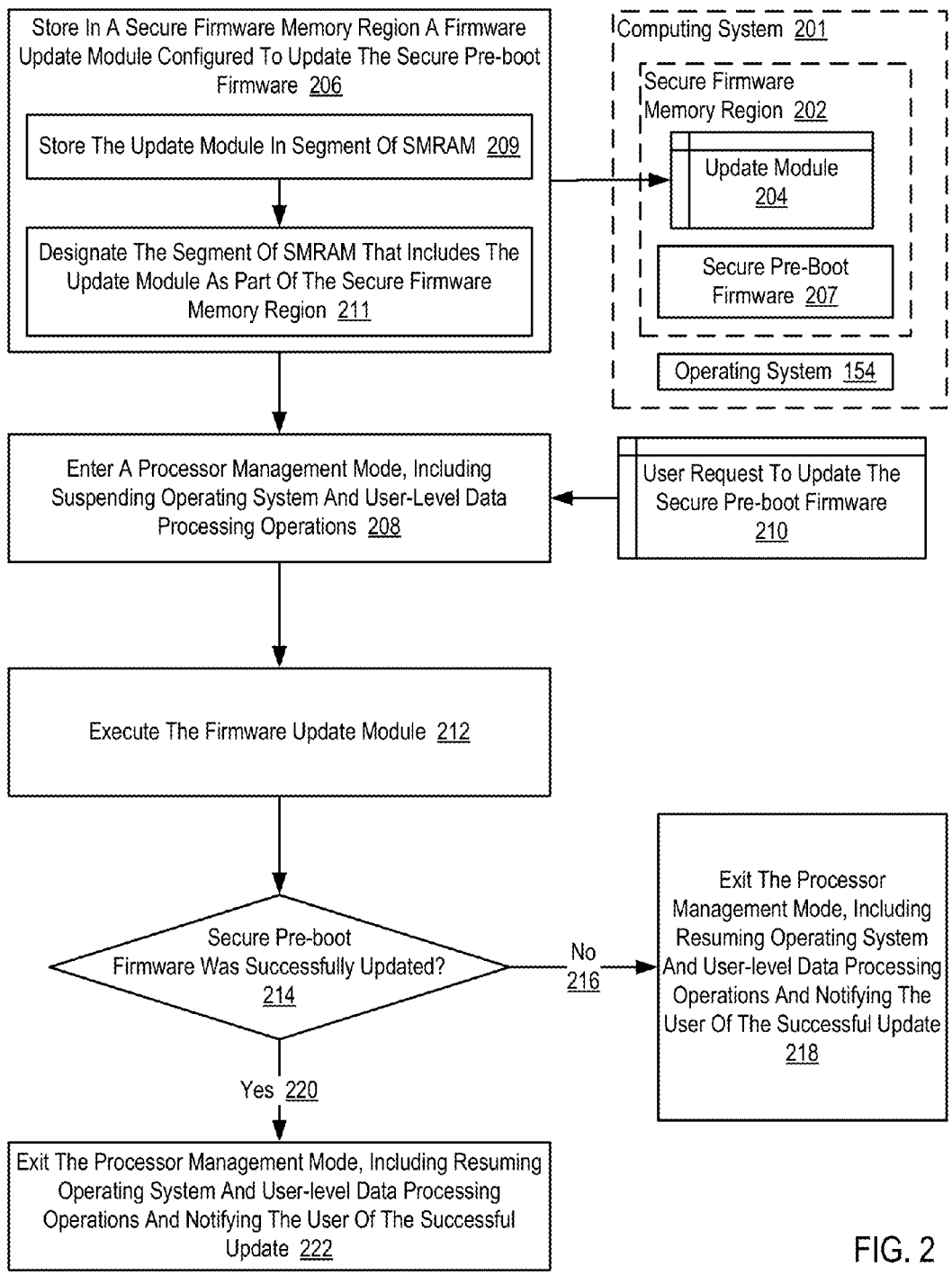
FIG. 2 sets forth a flow chart illustrating an exemplary method for updating secure pre-boot firmware in a computing system in real-time according to embodiments of the present invention.

For further explanation, FIG. 2 sets forth a flow chart illustrating an exemplary method for updating secure pre-boot firmware (207) in a computing system (201) in real-time according to embodiments of the present invention. In the example method of FIG. 2, the secure pre-boot firmware (207) is a module of computer program instructions that are executed by the computing system (201) when the computing system (201) is powered on and prior to bootloading an operating system. The secure pre-boot firmware (207) may be configured to initialize system devices, set the system clock, enable or disable system components, and so on. In the example method of FIG. 2, the operating system (154) only begins executing after the secure pre-boot firmware (207) has executed.

The example method of FIG. 2 includes storing (206) in a secure firmware memory region (202) a firmware update module (204) configured to update the secure pre-boot firmware (207). The firmware update module (204) is a module of computer program instructions that, when executed, perform updates to secure pre-boot firmware (207). The firmware update module (204) may perform updates to secure pre-boot firmware (207), for example, by altering computer program instructions contained in the secure pre-boot firmware (207), adding computer program instructions to the secure pre-boot firmware (207), deleting computer program instructions from the secure pre-boot firmware (207), and so on.

In the example method of FIG. 2, the firmware update module (204) is stored (206) in a secure firmware memory region (202) of the computing system (201). The secure firmware memory region (202) of FIG. 2 is portion of computer memory in a computer system (201) that is reserved for secure code. Code is characterized as being 'secure code' because the code is executed in a system management mode ('SMM'). SMM is an operating mode in which all normal execution of software in a computing system (201) is suspended and secure code such as firmware is executed in a high-privilege mode. While the computing system (201) is operating in SMM mode, execution of the operating system (154) and all user-level applications is suspended. The computing system (201) of FIG. 2 may enter SMM mode, for example, by signaling a dedicated system management interrupt ('SMI') pin on a computer processor in the computing system (201).

In the example method of FIG. 2, storing (206) a firmware update module (204) in a secure firmware memory region (202) includes storing (209) the firmware update module (204) in segment of system management random access memory ('SMRAM'). SMRAM is a portion of computer memory in the computing system (201) that is used by a computer processor in the computing system to store data associated with operating in an SMM operating mode. The SMRAM may be used, for example, to store the state of the computer processor prior to entering SMM mode. In the example method of FIG. 2, the firmware update module (204) may also be stored in SMRAM.

In the example method of FIG. 2, storing (206) a firmware update module (204) in a secure firmware memory region (202) also includes designating (211) the segment of SMRAM that includes the firmware update module (204) as part of the secure firmware memory region (202). In the example method of FIG. 2, designating (211) the segment of SMRAM that includes the firmware update module (204) as part of the secure firmware memory region (202) may be carried out, for example, by adding logic to a computer processor in the computing system that adds the segment of SMRAM that includes the firmware update module (204) to the secure firmware memory region (202) address space from the perspective of the computer processor.

The example method of FIG. 2 also includes, responsive to a user request (210) to update the secure pre-boot firmware (207), entering a processor management mode. In the example of FIG. 2, entering the processor management mode includes suspending operating system (154) and user-level data processing operations. Entering a processor management mode may be carried out, for example, by entering an SMM mode by signaling a dedicated SMI pin on each computer processor in the computing system (201). In the example method of FIG. 2, the processor management mode is entered in response to a user request (210) to update the secure pre-boot firmware (207). The a user request (210) to update the secure pre-boot firmware (207) may be embodied, for example, as a data structure that includes information identifying the secure pre-boot firmware (207), information identifying the updates to be made, new code that is to replace some portion of the secure pre-boot firmware (207), and so on.

The example method of FIG. 2 also includes executing (212) the firmware update module (204). In the example method of FIG. 2, the firmware update module (204) is a module of computer program instructions that, when executed, perform updates to secure pre-boot firmware (207). The firmware update module (204) may be executed, for example, by a computer processor executing secure code as part of the computer processor operating in SMM mode. That is, the computer processor may enter SMM mode and subsequently execute all computer program instructions included in the secure firmware memory region (202). Because the firmware update module (204) is included in the secure firmware memory region (202), the firmware update module (204) will therefore be executed (212) as part of system management operations carried out by a computer processor executing in SMM mode.

The example method of FIG. 2 also includes determining (214) whether the secure pre-boot firmware (207) was successfully updated. In the example of FIG. 2, determining (214) whether the secure pre-boot firmware (207) was successfully updated may be carried out, for example, by verifying that no exceptions were raised when executing the firmware update module (204), by checking return values generated when executing the firmware update module (204), and so on.

The example method of FIG. 2 also includes, responsive to determining that the secure pre-boot firmware was (220) successfully updated, exiting (222) the processor management mode. In the example method of FIG. 2, exiting (222) the processor management mode includes resuming operating system (154) and user-level data processing operations. Resuming operating system (154) and user-level data processing operations may be carried out, for example, by signaling the SMI pin on a computer processor in the computing system (201) to SMI-, by restoring a processor state stored in SMRAM, and so on. In the example method of FIG. 2, exiting (222) the processor management mode also includes notifying the user of the successful update. Notifying the user of the successful update may be carried out, for example, by sending a response message to an application-level program that initiated the update. Such a response message may include information, such as a success field, whose values indicate that the update completed successfully.

The example method of FIG. 2 also includes, responsive to determining that the secure pre-boot firmware (207) was not (216) successfully updated, exiting (218) the processor management mode. Resuming operating system (154) and user-level data processing operations may be carried out, for example, by signaling the SMI pin on a computer processor in the computing system (201) to SMI-, by restoring a processor state stored in SMRAM, and so on. In the example of FIG. 2, exiting (218) the processor management mode includes resuming operating system (154) and user-level data processing operations. In the example of FIG. 2, exiting (218) the processor management mode also includes notifying the user of an unsuccessful update. Notifying the user of an unsuccessful update may be carried out, for example, by sending a response message to an application-level program that initiated the update. Such a response message may include information, such as a success field, whose values indicate that the update did not complete successfully.

Readers will appreciate that because the firmware update module (204) was executed (212) in a processor management mode, secure pre-boot firmware (207) in the computing system (201) may be updated in real-time in the sense that the secure pre-boot firmware (207) is updated without needing to restart the computing system (201). Rather than requiring a system reboot, the secure pre-boot firmware (207) is updated in a processor management mode, the processor management mode is exited (218), and normal processing operations are resumed.

Figure 3:
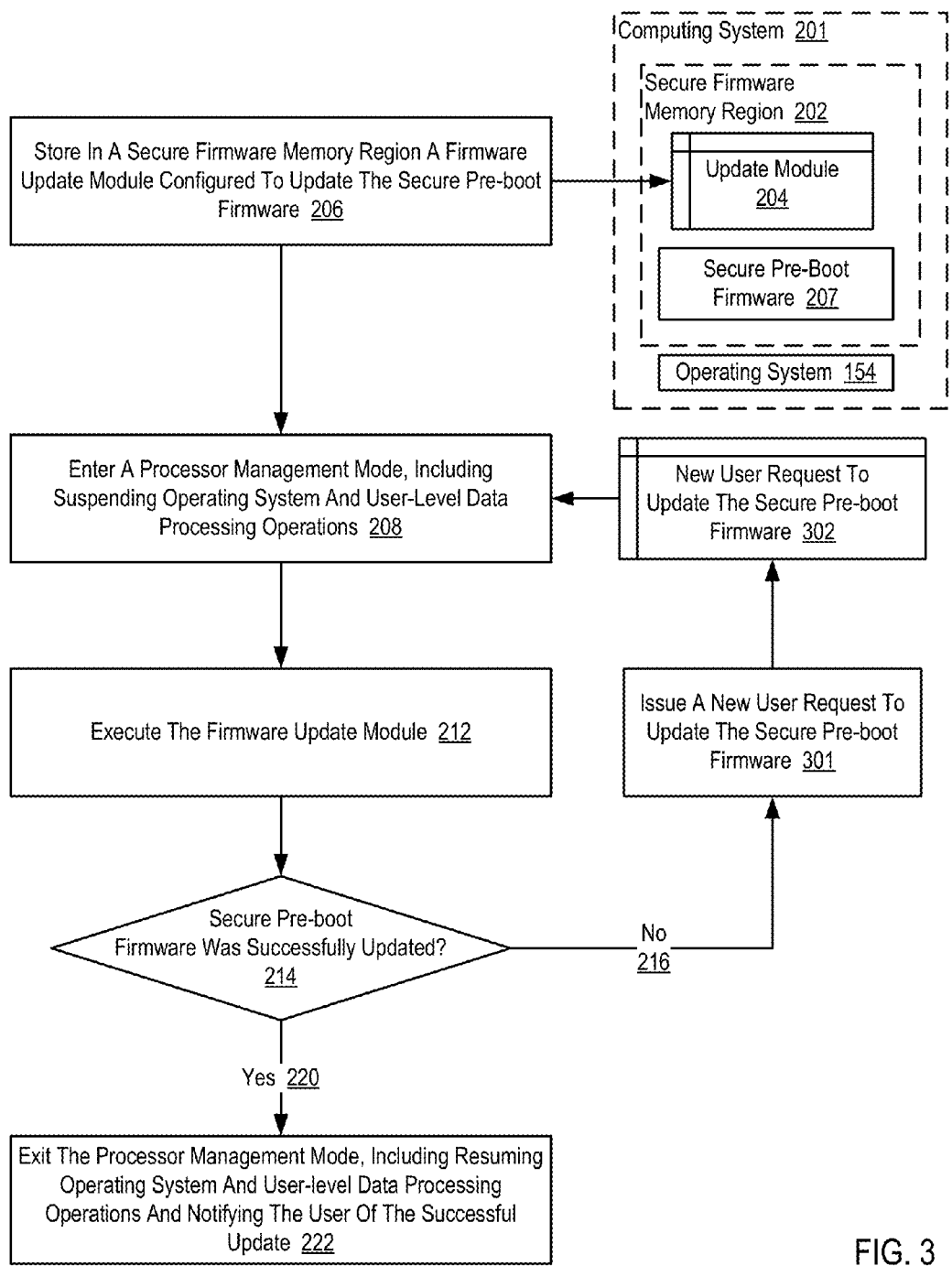
FIG. 3 sets forth a flow chart illustrating an exemplary method for updating secure pre-boot firmware in a computing system in real-time according to embodiments of the present invention.

For further explanation, FIG. 3 sets forth a flow chart illustrating a further exemplary method for updating secure pre-boot firmware (207) in a computing system (201) in real-time according to embodiments of the present invention. The example method of FIG. 3 is similar to the example method of FIG. 2, as the example method of FIG. 3 also includes storing (206) a firmware update module (204) in a secure firmware memory region (202), entering (208) a processor management mode, executing (212) the firmware update module (204), determining (214) whether the secure pre-boot firmware (207) was successfully updated, and exiting (222) the processor management mode if the secure pre-boot firmware (207) was (220) successfully updated.

The example method of FIG. 3 also includes, in response to determining that the secure pre-boot firmware (207) was not (216) successfully updated, issuing (301) a new user request (302) to update the secure pre-boot firmware (207). Rather than exiting the processor management mode after determining that the secure pre-boot firmware (207) was not (216) successfully updated, the method of FIG. 3 retries the attempt to update the secure pre-boot firmware by issuing (301) a new user request to update the secure pre-boot firmware (207). The new user request to update the secure pre-boot firmware (207) may include, for example, error messages received during previous attempts to update the secure pre-boot firmware (207).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of updating secure pre-boot firmware in a computing system in real-time, the method comprising:
    storing in a secure firmware memory region a firmware update module configured to update the secure pre-boot firmware;
    responsive to a user request to update the secure pre-boot firmware:
    entering a processor management mode, including suspending operating system and user-level data processing operations;
    executing the firmware update module; and
    determining whether the secure pre-boot firmware was successfully updated; and
    responsive to determining that the secure pre-boot firmware was successfully updated, exiting the processor management mode, including:
    resuming operating system and user-level data processing operations, and
    notifying the user of the successful update.

2. The method of claim 1 wherein storing in the secure firmware memory region the firmware update module configured to update the secure pre-boot firmware includes:
    storing the firmware update module in segment of system management random access memory ('SMRAM'); and
    designating the segment of SMRAM that includes the firmware update module as part of the secure firmware memory region.

3. The method of claim 1 further comprising responsive to determining that the secure pre-boot firmware was not successfully updated, exiting the processor management mode, including:
    resuming operating system and user-level data processing operations, and
    notifying the user of an unsuccessful update.

4. The method of claim 1 further comprising responsive to determining that the secure pre-boot firmware was not successfully updated, issuing a new user request to update the secure pre-boot firmware.

5. The method of claim 1 wherein the processor management mode is a system management mode.

6. The method of claim 1 wherein entering the processor management mode further comprises verifying that all computer processors in the computing system have entered the processor management mode.

7. An apparatus for updating secure pre-boot firmware in a computing system in real-time, the apparatus comprising a computer processor, a computer memory operatively coupled to the computer processor, the computer memory having disposed within it computer program instructions that, when executed by the computer processor, carry the steps of:
   storing in a secure firmware memory region a firmware update module configured to update the secure pre-boot firmware;
   responsive to a user request to update the secure pre-boot firmware:
   entering a processor management mode, including suspending operating system and user-level data processing operations;
   executing the firmware update module; and
   determining whether the secure pre-boot firmware was successfully updated; and
   responsive to determining that the secure pre-boot firmware was successfully updated, exiting the processor management mode, including:
   resuming operating system and user-level data processing operations, and
   notifying the user of the successful update.

8. The apparatus of claim 7 wherein storing in the secure firmware memory region the firmware update module configured to update the secure pre-boot firmware includes:
   storing the firmware update module in segment of system management random access memory ('SMRAM'); and
   designating the segment of SMRAM that includes the firmware update module as part of the secure firmware memory region.

9. The apparatus of claim 7 further comprising computer program instructions that, when executed by the computer processor, carry the step of responsive to determining that the secure pre-boot firmware was not successfully updated, exiting the processor management mode, including:
   resuming operating system and user-level data processing operations, and
   notifying the user of an unsuccessful update.

10. The apparatus of claim 7 further comprising computer program instructions that, when executed by the computer processor, carry the step of responsive to determining that the secure pre-boot firmware was not successfully updated, issuing a new user request to update the secure pre-boot firmware.

11. The apparatus of claim 7 wherein the processor management mode is a system management mode.

12. The apparatus of claim 7 wherein entering the processor management mode further comprises verifying that all computer processors in the computing system have entered the processor management mode.

13. A computer program product for updating secure pre-boot firmware in a computing system in real-time, the computer program product disposed upon a computer readable storage medium, the computer program product comprising computer program instructions that, when executed, cause a computer to carry out the steps of:
   storing in a secure firmware memory region a firmware update module configured to update the secure pre-boot firmware;
   responsive to a user request to update the secure pre-boot firmware:
   entering a processor management mode, including suspending operating system and user-level data processing operations;
   executing the firmware update module; and
   determining whether the secure pre-boot firmware was successfully updated; and
   responsive to determining that the secure pre-boot firmware was successfully updated, exiting the processor management mode, including:
   resuming operating system and user-level data processing operations, and
   notifying the user of the successful update.

14. The computer program product of claim 13 wherein storing in the secure firmware memory region the firmware update module configured to update the secure pre-boot firmware includes:
   storing the firmware update module in segment of system management random access memory ('SMRAM'); and
   designating the segment of SMRAM that includes the firmware update module as part of the secure firmware memory region.

15. The computer program product of claim 13 further comprising computer program instructions that, when executed, cause a computer to carry out the step of responsive to determining that the secure pre-boot firmware was not successfully updated, exiting the processor management mode, including:
   resuming operating system and user-level data processing operations, and
   notifying the user of an unsuccessful update.

16. The computer program product of claim 13 further comprising computer program instructions that, when executed, cause a computer to carry out the step of responsive to determining that the secure pre-boot firmware was not successfully updated, issuing a new user request to update the secure pre-boot firmware.

17. The computer program product of claim 13 wherein the processor management mode is a system management mode.

18. The computer program product of claim 13 wherein entering the processor management mode further comprises verifying that all computer processors in the computing system have entered the processor management mode.

* * * * *